UNITED STATES PATENT OFFICE.

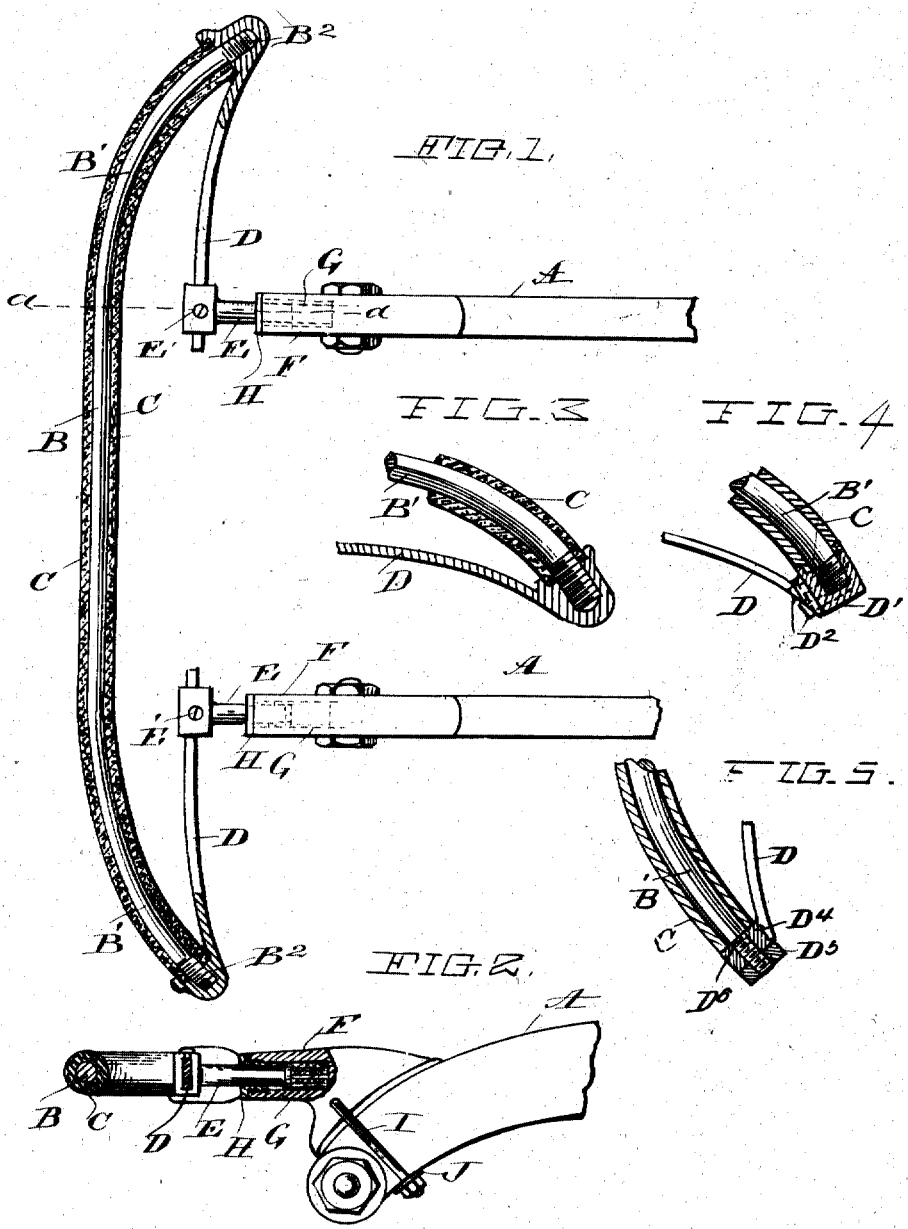

FRANK KOUBEK, OF CLEVELAND, OHIO.

FENDER.

1,281,397.     Specification of Letters Patent.     Patented Oct. 15, 1918.

Application filed December 15, 1916. Serial No. 137,261.

*To all whom it may concern:*

Be it known that I, FRANK KOUBEK, a citizen of the United States, and resident of Cleveland, in the county of Cuyahoga and State of Ohio, have invented certain new and useful Improvements in Fenders, of which I hereby declare the following to be a full, clear, and exact description, such as will enable others skilled in the art to which it appertains to make and use the same.

The objects of the invention are to provide a simple and substantial form of fender for motor vehicles, which is longitudinally and vertically adjustable to accommodate it to the width and height of the running gear of the vehicle.

The invention comprises a transverse bar which is extended in front of or in the rear of the vehicle at a slight distance therefrom, and is connected with fixed portions of the frame by means of laterally and inwardly extending spring bars which connect the outer ends of said bar with said fixed portions of said frames.

The invention also includes a resilient outer coating such as a solid rubber sleeve mounted upon the transverse bar and means for detachably connecting the said spring bars to the ends of said transverse bar and to said frame portions.

The invention further comprises the combination and arrangement of parts hereinafter described, shown in the accompanying drawings, and specifically pointed out in the claims.

In the accompanying drawings Figure 1 is a plan of the device; Fig. 2 is a transverse section of the transverse and spring bars; Fig. 3 is an enlarged horizontal section of the connection between the end of the transverse bar and one of the lateral spring supports; Figs. 4 and 5 show modifications of the connection between the front and spring bars.

In these views A, A, are extremities of the frame of the vehicle. B is a bar transversely positioned in front of the frame and having its extremities turned rearwardly at B' B'.

C is a solid rubber sleeve mounted upon said transverse bar or rod B and designed to absorb the first shock of the impact. D, D are laterally and inwardly extending bars of spring steel or other spring metal into the enlarged ends or heads of which the ends of the bar B are screwed, and the inner extremities of these spring bars are inserted in the ends of the longitudinal rods E, E, and are made adjustable therein by means of set screws E' E'.

These longitudinal bars or rods are in turn longitudinally movable within a short limit in the socket members F, F, and impinge against the rubber buffers G, G, inclosed within the socket members.

Cap nuts H, H, secure the rods E, E, in place. The socket members F, F, can be longitudinally adjusted upon the curved ends of the frame members A, A, to give vertical adjustment to the forward end of the fender, by means of the hook bolts I, I, and clamping bars J, J. When in use the shock of a collision is partially absorbed by the resilient sleeve C, is further reduced by the yielding of the lateral spring bars E, and is also received upon the inclosed rubber buffers G, G, thus protecting the exposed parts of the vehicle and the delicate engines from injury.

It is obvious that the front bar B and the lateral spring bars D, D can be made integral if desired, and the rubber coating slipped over the end. It is preferred however to make them as shown in Figs. 1, 3, 4, or 5.

In Fig. 4 the bar D is shown attached to a separate cap D' by means of bolts or screws $D^2$.

In Fig. 5 the end of the bar is shaped like an eye at $D^4$ and a nut $D^5$ clamps it against a shoulder $D^6$ on the extremity B' of the rod B.

Other modifications are included within the scope of the claims.

Having described the invention what I claim as new and desire to secure by Letters Patent is:—

1. In a device for the purpose described, a frame, a bow shaped transverse bar provided with a resilient inclosing sleeve, and having its extremities rearwardly turned, laterally extending spring bars, secured at their outer ends to the extremities of said bow shaped bar socket members upon said frame and spring pressed spring holding members, longitudinally movable in said socket members, the inner extremities of said spring bars adjustably secured in said spring holding members.

2. In a fender for a vehicle, the combination with a frame and a bow shaped bumper member, said bumper member having its ends turned rearwardly, bars extending laterally from the ends of said bow shaped bumper member, said bars being more resilient than said bumper member, sockets in said frame, spring pressed holding members, to which said lateral bars are secured, said holding members longitudinally movable in said socket members.

3. The combination in a vehicle fender, of a transverse bar curved at its ends, spring bars laterally and inwardly extending from the curved ends of said transverse bar, said spring bars having enlarged heads in which the ends of said transverse bar are rigidly secured and a resilient sleeve mounted upon said transverse bar and retained in position by said enlarged head, a frame, socket members secured thereto, spring pressed rods therein, and means for securing said spring bars in said rods.

In testimony whereof, I hereunto set my hand this 13th day of Nov. 1916.

FRANK KOUBEK.

In presence of—
WM. M. MONROE,
S. W. SANGSTER.